US 8,656,507 B2

(12) United States Patent
Honda

(10) Patent No.: US 8,656,507 B2
(45) Date of Patent: Feb. 18, 2014

(54) APPARATUS, SYSTEM AND COMPUTER READABLE MEDIUM FOR TRANSMITTING ELECTRONIC INFORMATION IN RESPONSE TO A DETERMINATION THAT CHANGED ACCESS RIGHT INFORMATION SATIFIES A STORED CONDITION

(75) Inventor: Kensaku Honda, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 1478 days.

(21) Appl. No.: 12/053,270

(22) Filed: Mar. 21, 2008

(65) Prior Publication Data
US 2009/0064345 A1 Mar. 5, 2009

(30) Foreign Application Priority Data

Sep. 3, 2007 (JP) ................................ 2007-227371

(51) Int. Cl.
*G06F 7/04* (2006.01)
*G06F 17/30* (2006.01)
*H04N 7/16* (2011.01)

(52) U.S. Cl.
USPC .................................. 726/28; 726/1; 726/30

(58) Field of Classification Search
None
See application file for complete search history.

(56) References Cited

U.S. PATENT DOCUMENTS

| 7,827,615 | B1* | 11/2010 | Allababidi et al. | 726/28 |
| 2005/0071280 | A1* | 3/2005 | Irwin et al. | 705/59 |
| 2006/0005036 | A1* | 1/2006 | Hu et al. | 713/182 |
| 2007/0266441 | A1* | 11/2007 | Kim et al. | 726/26 |
| 2007/0271184 | A1* | 11/2007 | Niebert et al. | 705/51 |
| 2007/0277246 | A1* | 11/2007 | Kawell et al. | 726/27 |
| 2008/0189617 | A1* | 8/2008 | Covell et al. | 715/738 |

FOREIGN PATENT DOCUMENTS

| JP | 2000-200209 A | 7/2000 |
| JP | 2005-38124 A | 2/2005 |
| JP | 2006-85705 A | 3/2006 |

* cited by examiner

*Primary Examiner* — Nadia Khoshnoodi
(74) *Attorney, Agent, or Firm* — Sughrue Mion, PLLC

(57) ABSTRACT

An information management apparatus includes: a registration unit, a condition storage, a determination unit, a transmission unit and a deletion unit. The registration unit registers electronic information in association with access right information representing whether a user has an access right. The condition storage stores a condition for prohibiting an access to the electronic information registered by the registration unit on the basis of an administrator's right for the apparatus. The determination unit determines whether the changed access right information satisfies the condition stored in the condition storage. The transmission unit transmits the electronic information to a transmission destination in a case where the determination unit determines that the access right information of the electronic information satisfies the condition. The deletion unit deletes the electronic information stored in a transmission source after the electronic information is transmitted by the transmission unit.

3 Claims, 6 Drawing Sheets

FIG. 3A

| TITLE | ID | HISTORY | ACCESS RIGHT | REGISTRATION PLACE |
|---|---|---|---|---|
| DOCUMENT A | 001 | GENERATED ON 2006/01/01 USER 1 | EMPLOYEE GROUP 111 | ELECTRONIC INFORMATION REGISTRATION UNIT OF THE FIRST INFORMATION MANAGEMENT APPARATUS |

FIG. 3B

| TITLE | ID | HISTORY | ACCESS RIGHT | REGISTRATION PLACE |
|---|---|---|---|---|
| DOCUMENT A | 001 | GENERATED ON 2006/01/01 USER 1<br>ACCESS RIGHT CHANGE ON 2006/04/05 USER 2 | EMPLOYEE G 000<br>PERSONNEL GROUP 111 | ELECTRONIC INFORMATION REGISTRATION UNIT OF THE SECOND INFORMATION MANAGEMENT APPARATUS |

APPARATUS, SYSTEM AND COMPUTER READABLE MEDIUM FOR TRANSMITTING ELECTRONIC INFORMATION IN RESPONSE TO A DETERMINATION THAT CHANGED ACCESS RIGHT INFORMATION SATIFIES A STORED CONDITION

CROSS-REFERENCE TO RELATED APPLICATIONS

This application is based on and claims priority under 35 U.S.C. 119 from Japanese Patent Application No. 2007-227371 filed Sep. 3, 2007.

BACKGROUND

Technical Field

The present invention relates to an information management apparatus, an information management system and a computer readable medium.

SUMMARY

According to an first aspect of the present invention, an information management apparatus includes: a registration unit that registers electronic information in association with access right information; a condition storage that stores a condition for prohibiting an access to the electronic information registered by the registration unit on the basis of an administrator's right for the apparatus; a determination unit that determines whether the changed access right information satisfies the condition stored in the condition storage; a transmission unit that transmits the electronic information to a predetermined transmission destination in a case where the determination unit determines that the access right information of the electronic information satisfies the condition; and a deletion unit that deletes the electronic information stored in a transmission source after the electronic information is transmitted by the transmission unit.

BRIEF DESCRIPTION OF THE DRAWINGS

Exemplary embodiment of the present invention will be described in detail based on the following figures, wherein:

FIGS. 3A and 3B are diagrams showing an example of management information;

DETAILED DESCRIPTION

Hereinafter, a best mode for carrying out the present invention (hereinafter, referred to as an embodiment) will be described with reference to the accompanying drawings.

Figure 1:
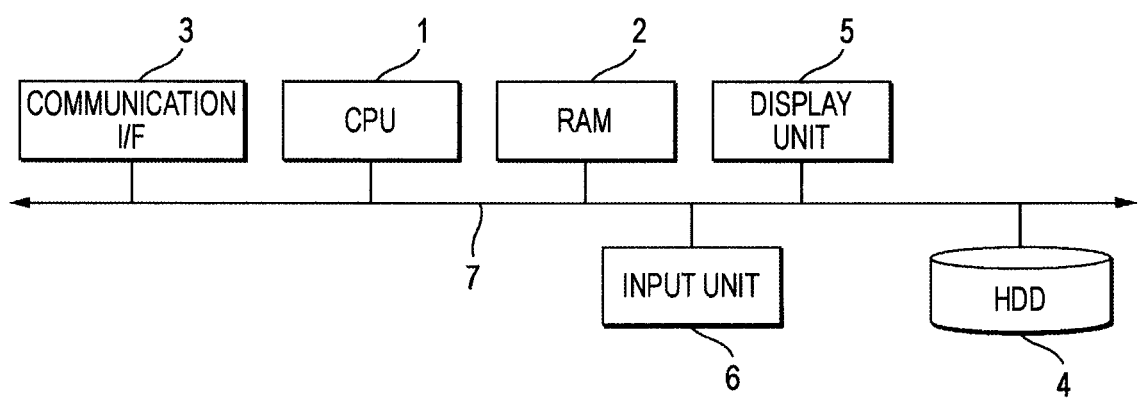
FIG. 1 is a diagram showing an example of the hardware configuration of a computer constituting an information management system according to an embodiment of the present invention.

FIG. 1 shows an example of the hardware configuration of a computer constituting an information management system according to an embodiment of the present invention. As shown in FIG. 1, the computer includes a central processing unit (for example, a CPU can be used) 1, a random access memory (RAM) 2, a communication interface 3, a hard disk unit (HDD) 4, a display unit 5, and an input unit 6. These constituent elements are interconnected with one another through a bus 7.

The CPU 1 controls operations of each unit, based on a control program stored in the RAM 2 or the hard disk unit 4. The RAM 2 primarily serves as an operation area of the CPU 1.

The communication interface 3 is constituted by an appropriate communication interface such as a USB (universal serial bus) port or a network port. The communication interface is used for the CPU 1 to transmit/receive various types of data to/from an external apparatus.

The hard disk unit 4 is a large capacity device and can store various types of data required for processes described later.

The display unit 5 is constituted by a liquid crystal display or the like and displays the result of a process performed by the CPU 1 and the like.

The input unit 6 is constituted by a keyboard, a pointing device, or the like and is used for a user to input an operation direction or the like.

The display unit 5 and the input unit 6 are not essential elements, and may be omitted.

Figure 2:
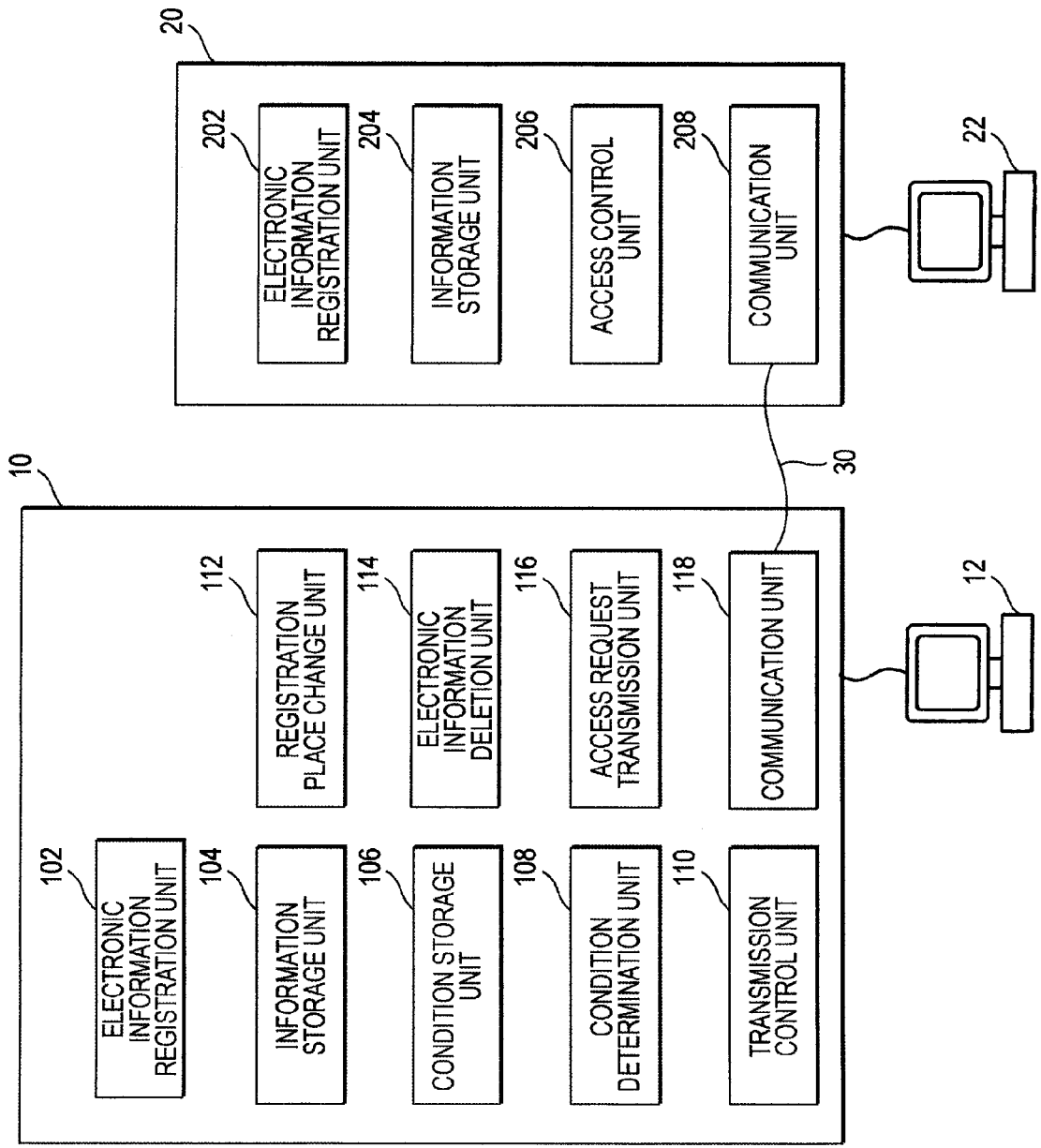
FIG. 2 is a functional block diagram of an information management system according to an embodiment of the present invention.

FIG. 2 shows a functional block diagram of an information management system according to an embodiment of the present invention. As shown in FIG. 2, the information management system includes a first information management apparatus 10 and a second information management apparatus 20. In this embodiment, the first information management apparatus 10 handles information for which the degree of access restriction request is not high, and the second information management apparatus 20 handles information such as personnel information for which the degree of access restriction request is high. The first information management apparatus 10 and the second information management apparatus 20 are configured to transmit or receive information each other through communication means 30 such as a network or the like.

The first information management apparatus 10 is implemented on the computer. The first information management apparatus includes an electronic information registration unit 102, an information storage unit 104, a condition storage unit 106, a condition determination unit 108, a transmission control unit 110, a registration place change unit 112, an electronic information deletion unit 114, an access request transmission unit 116, and a communication unit 118.

The electronic information registration unit 102 is constituted by the RAM 2 and the hard disk unit 4, which are shown in FIG. 1, and a program allowing the CPU 1 to control the RAM and the hard disk unit. The electronic information registration unit 102 registers electronic information including an electronic document (document data), image data, voice data, a source code of the program, an execution mode of the program, and the like, in association with identification information of the electronic information. Here, the registration process at least includes a process for receiving and maintaining the electronic information. The electronic information registration unit 102 may be configured to store the electronic information in association with access right information described later.

The information storage unit 104 is constituted by the RAM 2, the hard disk unit 4, and a program allowing the CPU 1 to control the RAM and the hard disk unit. The information storage unit 104 stores information (information representing access rights of users; hereinafter referred to as access right information) on access rights for the electronic information registered in the electronic information registration unit 102, registration place information representing whether the electronic information for the access right is registered in an electronic information registration unit 102 or 202, and the like, in association with the identification information. Here, an access means acquisition of electronic information from the electronic information registration unit 102 for performing a process such as a reference (read) process, a writing process, or a printing process for the electronic information registered in the electronic information registration unit 102. In addition, the access right means a privilege for being permitted to perform the access in the information management system according to this embodiment. In addition, the access request means to request the electronic information registration unit 102 for use of the electronic information so as to perform the process such as the reference (read) process, the writing process, or the printing process.

The condition storage unit 106 is constituted by the RAM 2, the hard disk unit 4, and a program allowing the CPU 1 to control the RAM and the hard disk unit. The condition storage unit 106 stores a condition for prohibiting an access to the electronic information, which has been registered by the electronic information registration unit 102, on the basis of the administrator's right for the apparatus. This condition is set as access right information for information such as personnel information for which the degree of access restriction request is high, and is used for prohibiting an access on the basis of the administrator's right for the information management apparatus, for example, to information for which persons other than staffs of a personnel department do not have access rights. Here, the administrator's right is a privilege permitted to have the range of accesses needed as an administrator for performing an operation such as a maintenance operation of the first information management apparatus 10.

The condition determination unit 108, for example, includes the CPU 1 and a program for controlling a process operation of the CPU 1. When the electronic information and the access right information thereof are newly registered in the electronic information registration unit 102 and the information storage unit 104 or the access right information of the electronic information registered by the electronic information registration unit 102 is changed, the condition determination unit 108 determines whether the newly registered or changed access right information satisfies the condition stored in the condition storage unit 106, that is, whether the condition is set in the access right information.

The transmission control unit 110, for example, includes the CPU 1 and a program controlling the process operation of the CPU 1. The transmission control unit 110 transmits a request for registering target electronic information to the external information management apparatus (in this example, the second information management apparatus 20) through the communication unit 118 in a case where the condition determination unit 108 determines that the newly registered or changed access right information satisfies the condition. In such a case, the transmission control unit 110, for example, may be configured to transmit the target electronic information together with the registration request. The registration request and the electronic information may be configured to be transmitted, for example, via an electronic mail. Here, the registration request is command information requesting the external information management apparatus to register the target electronic information.

The registration place change unit 112, for example, includes the CPU 1 and a program for controlling the process operation of the CPU 1. The registration place change unit 112 changes registration place information associated with the identification information of the target electronic information to a transmission source (in this example, the electronic information registration unit 202 of the second information management apparatus 20) transmitting the registration request through the communication unit 118 in a case where the condition determination unit 108 determines that the newly registered or changed access right information satisfies the condition.

The electronic information deletion unit 114, for example, includes the CPU 1 and a program for controlling the process operation of the CPU 1. After the transmission control unit 110 transmits the registration request for the electronic information of which access right information has been newly registered or changed, the electronic information deletion unit 114 deletes the electronic information of the transmission source from the electronic information registration unit 102. It is appropriate that the electronic information deletion unit 114 is configured to delete the electronic information of the transmission source after checking that the transmission control unit 110 has transmitted the electronic information targeted for the registration request.

The access request transmission unit 116, for example, includes the CPU 1 and a program for controlling the process operation of the CPU 1. When the communication unit 118 receives the access request, the access request transmission unit 116 checks whether a user who has transmitted the access request has the access right. When it is checked that the user has the access right, the access request transmission unit 116 checks the registration place information associated with the identification information of the electronic information targeted for the access request. When an external information management apparatus (for example, the second information management apparatus 20) is represented as the registration place, the access request transmission unit 116 transmits the access request to the external information management apparatus through the communication unit 118.

The communication unit 118 includes the communication interface 3. The communication unit 118 transmits or receives electronic information or the like between the first information management apparatus 10 and the second information management apparatus 20.

The second information management apparatus 20 is implemented on the computer and includes the electronic information registration unit 202, the information storage unit 204, the access control unit 206, and the communication unit 208.

The electronic information registration unit 202 is constituted by the RAM 2 and the hard disk unit 4 which are shown in FIG. 1 and a program allowing the CPU 1 to control the RAM and the hard disk unit. Like the electronic information registration unit 102, the electronic information registration unit 202 registers the electronic information in association with the identification information.

The information storage unit 204 is constituted by the RAM 2 and the hard disk unit 4 which are shown in FIG. 1 and a program allowing the CPU 1 to control the RAM and the hard disk unit. The information storage unit 204 stores the access right information, the registration place information, and the like for the electronic information registered in the electronic information registration unit 202 in association with the identification information.

The access control unit 206, for example, includes the CPU 1 and a program for controlling the process operation of the CPU 1. When a user transmits an access request for the electronic information registered in the electronic information registration unit 202, for example, from a computer 22 described later or the like, the access control unit 206 checks whether the user has the access right by referring to the access right information stored in the information storage unit 204 and determines whether to accept the access request. In addition, when the communication unit 208 receives an access request for the electronic information registered in the electronic information registration unit 202 from the first information management apparatus 10, the access control unit 206 accepts the access request, accesses the target electronic information, and performs a requested process. In this case, since the access request transmission unit 116 of the first information management apparatus 10 already has checked whether the user has the access right, the process of referring to the access right stored in the information storage unit 204 may be omitted.

The communication unit 208 includes the communication interface 3. The communication unit 208 transmits or receives the electronic information or the like between the first information management apparatus 10 and the second information management apparatus 20.

To the first information management apparatus 10 and the second information management apparatus 20, computers 12 and 22 that are used for accessing the electronic information by users may be connected through the communication units 118 and 208. The computers 12 and 22 also have the hardware configuration shown in FIG. 1.

In addition, in the embodiment shown in FIG. 2, although the information management system is constituted by the first information management apparatus 10 and the second information management apparatus 20, the configuration of the information management system is not limited thereto. For example, the first information management apparatus 10 and the second information management apparatus 20 may be implemented on one computer, and the first information management apparatus 10 or the second information management apparatus 20 may be implemented on a plurality of computers. When the first information management apparatus 10 and the second information management apparatus 20 are implemented on one computer, the communication means 30 disposed outside the apparatuses is not needed.

In FIGS. 3A and 3B, an example of the management information including the access right information and the registration place information which are stored in the information storage unit 104 is shown. In this example, document data is used as an example of the electronic information, and the title of a document, identification information (ID) of the document, history of the document, the content of the access right, and the registration place of the document are included as the management information. However, the title of the document, the identification information of the document, and the history of the document may be configured to be included in attribute information other than attribute information including the access right information and the registration place information.

As shown in FIG. 3A, "document A" has an ID of "001" and is written on Jan. 1, 2006 by "User 1". In "Document A", a code of "111" is attached to Employee Group (G)" representing all the employs for approving an access right. An employee to whom the access right is approved, for example, is permitted to refer (read) to, write, or print "Document A". In addition, the registration place for "Document A" is set as the electronic information registration unit 102 of the first information management apparatus 10.

When the content of the access right of "Document A" is changed by "User 2" as shown in FIG. 3B, the registration place change unit 112 changes the registration place. In other words, when the access right of "Employee Group" is cancelled (a code of "000" is attached) by "User 2" on Apr. 5, 2006 and an access right is set to "Personnel Group (G)" (a code of "111" is attached) representing a staff of the personnel department, the condition determination unit 108 determines whether the condition for prohibiting an access on the basis of the administrator's right which is stored in the condition storage unit 106 is satisfied. In the example shown in FIG. 3B, since an access right is set to "Personnel Group" and the access on the basis of the administrator's right for the first information management apparatus 10 is prohibited, the condition determination unit 108 determines that the above condition is satisfied. Thus, the registration place change unit 112 transmits the electronic information (of which title is "Document A") whose ID is "001" to the electronic information registration unit 202 of the second information management apparatus 20 handling information for which the restriction for the access right is strong. In accordance with the transmission, the registration place information is changed to the electronic information registration unit 202 of the second information management apparatus 20. At this moment, the electronic information deletion unit 114 deletes the electronic information from the electronic information registration unit 102 of the first information management apparatus 10. On the other hand, when the condition determination unit 108 determines that the above condition is not satisfied, the transmission process to be performed by the registration place change unit 112 and the deletion process to be performed by the electronic information deletion unit 114 are not performed, and the target electronic information is maintained to be stored in the electronic information registration unit 102.

Figure 4:
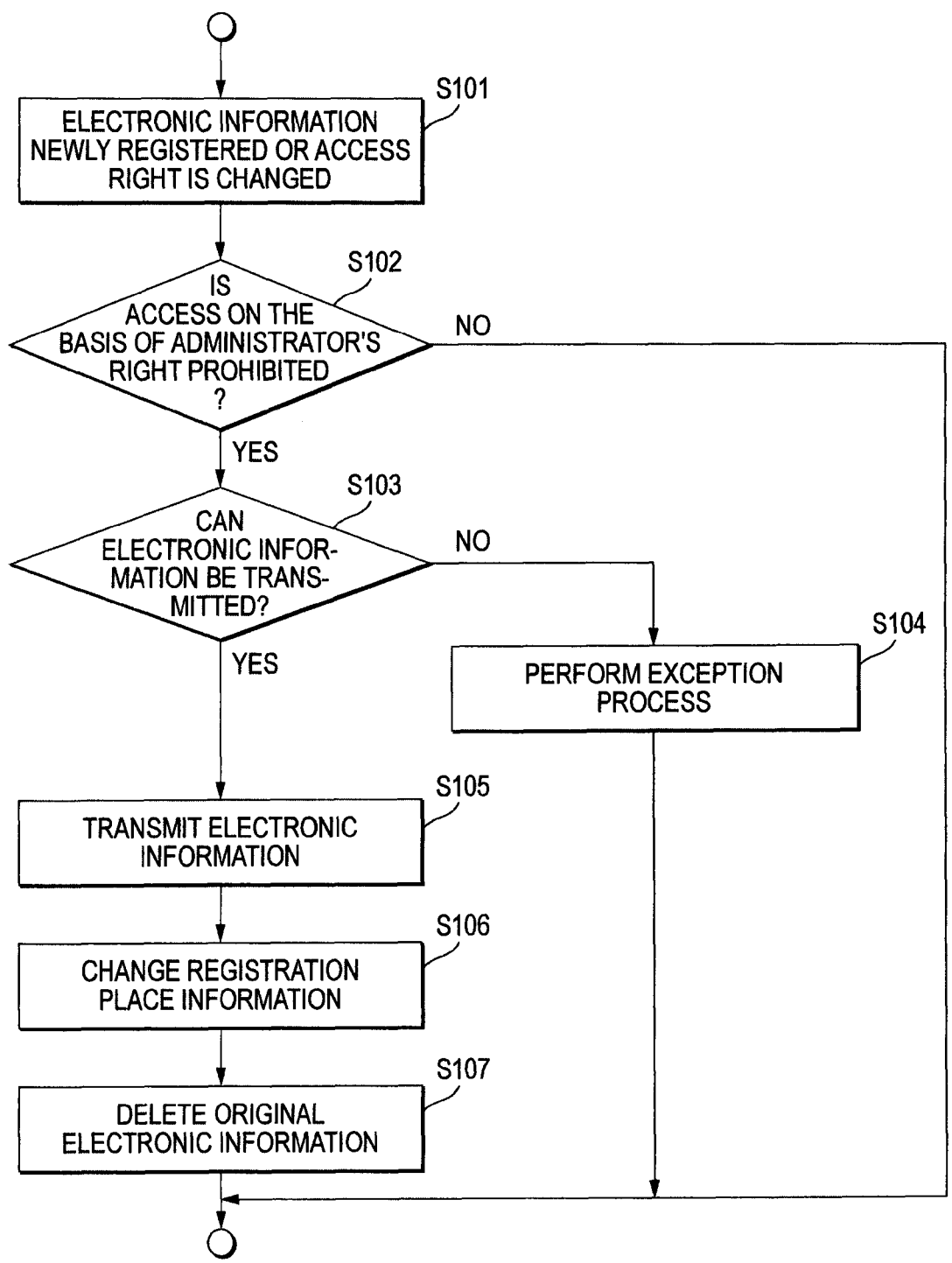
FIG. 4 is a diagram showing an example of the operation of an information management system according to an embodiment of the present invention.
Figure 5:
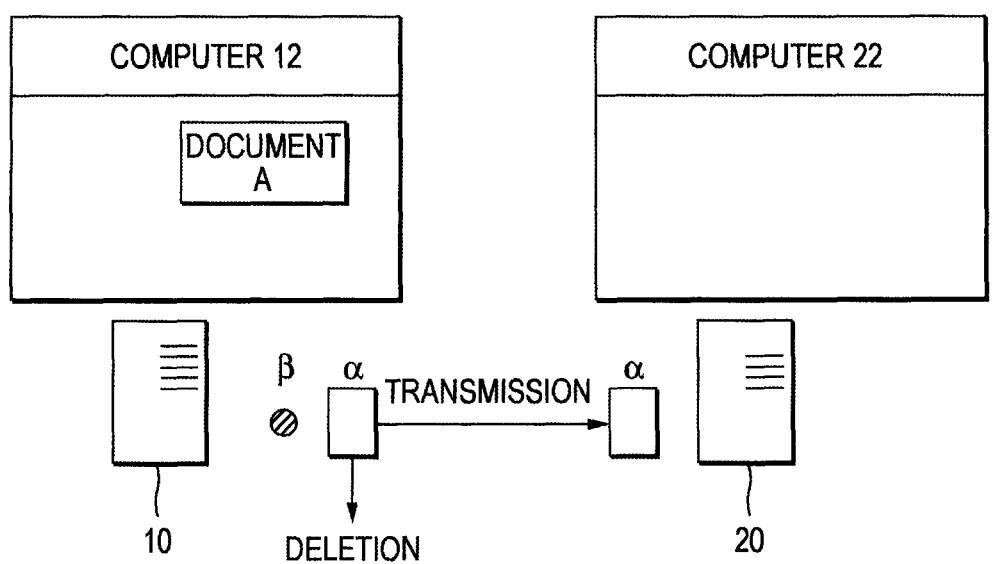
FIG. 5 is a diagram showing an example of the management information and a registration place of electronic information.

FIG. 4 shows an example of the operation of the information management system according to this embodiment. FIG. 5 is a diagram showing an example of management information including the access right information and the registration place information and the registration place of the electronic information.

As shown in FIG. 4, when a user newly registers electronic information such as a personnel document of which access right information is set to have strong access restriction as "Document A" from a computer 12 in the electronic information registration unit 102 or changes access right information of the electronic information which has been already registered in the electronic information registration unit 102 (S101), the condition determination unit 108 determines whether the access right information that has been newly registered or changed satisfies the condition for prohibiting an access on the basis of the administrator's right which is stored in the condition storage unit 106 (S102). Here, the condition for prohibiting an access on the basis of the administrator's right is not limited to the personnel information (Personnel G of "111" and Employee G of "000") shown in FIG. 3B. For example, a case where the access right is approved only to heads of departments (Department Head G of "111" and Department Staff G of "000") may be determined to satisfy the above condition.

When it is determined that the condition is not satisfied in S102, the process is completed. On the other hand, when it is determined that the condition is satisfied, it is checked whether the transmission control unit 110 can communicate between the first information management apparatus 10 and the second information management apparatus 20 through the communication units 118 and 208, there is a remaining capacity in the electronic information registration unit 202, and the like, and it is checked whether the electronic information can be transmitted to the electronic information registration unit 202 (S103). When the electronic information cannot be transmitted, an exception process such as a process of notifying the user of the situation is performed (S104).

When it is checked that the electronic information can be transmitted in S103, the transmission control unit 110 transmits target electronic information together with a registration request to the second information management apparatus 20 through the communication unit 118 (S105).

Then, the registration place change unit 112 changes the registration place information that is stored in the information storage unit 104 and is associated with the identification information of the electronic information from the first information management apparatus 10 to the second information management apparatus 20 which is the transmission source of the registration request (S106).

In this case, the access control unit 206 of the second information management apparatus 20 generates a registration place (address information or the like) of the transmitted electronic information in the electronic information registration unit 202 and registers the registration place in the information storage unit 204.

Then, the electronic information deletion unit 114 deletes the original electronic information registered in the electronic information registration unit 102 (S107). An administrator of the first information management apparatus 10 cannot access the transmitted electronic information by using the administrator's right for the first information management apparatus 10.

When "Document A" having a strong access restriction is newly registered in the first information management apparatus 10 or the access restriction becomes strong by changing the access right information of Document A, by performing the above-described operations, Document A registered in the first information management apparatus 10 is handled as shown in FIG. 5. In other words, electronic information α (represented by a rectangle) entitled Document A and management information β (represented by a circle) are registered in the first information management apparatus 10 in advance, and a diagram representing Document A is displayed on the screen of the computer 12 connected to the first information management apparatus 10 through the communication unit 118. Next, the electronic information α is transmitted to the electronic information registration unit 202 of the second information management apparatus 20 based on the above-described newly registered access right information or the changed access right information and is deleted from the first information management apparatus 10. On the other hand, the management information β of Document A which is stored in the information storage unit 104 of the first information management apparatus 10, as shown in FIG. 3B, is left in the information storage unit 104 of the first information management apparatus 10 after the registration place of the electronic information α is changed to the electronic information registration unit 202 of the second information management apparatus 20. Accordingly, on the screen of the computer 12, a state that the diagram representing Document A is displayed is maintained based on the management information. When the electronic information α is transmitted to the electronic information registration unit 202, the diagram representing Document A may be also displayed on the screen of the computer 22 connected to the second information management apparatus 20 through the communication unit 208. When the electronic information a entitled "Document A" is transmitted to the electronic information registration unit 202 of the second information management apparatus 20, the access right information of Document A and the above-described attribute information may be transmitted. In addition, when the electronic information α entitled Document A is transmitted to the electronic information registration unit 202 of the second information management apparatus 20 and is deleted from the first information management apparatus 10, the management information β of Document A may be deleted from the first information management apparatus 10. However, in such a case, even when there is an access request from a user to the first information management apparatus 10 after the electronic information is transmitted from the first information management apparatus 10 to the second information management apparatus 20, the user cannot access the electronic information.

Figure 6:
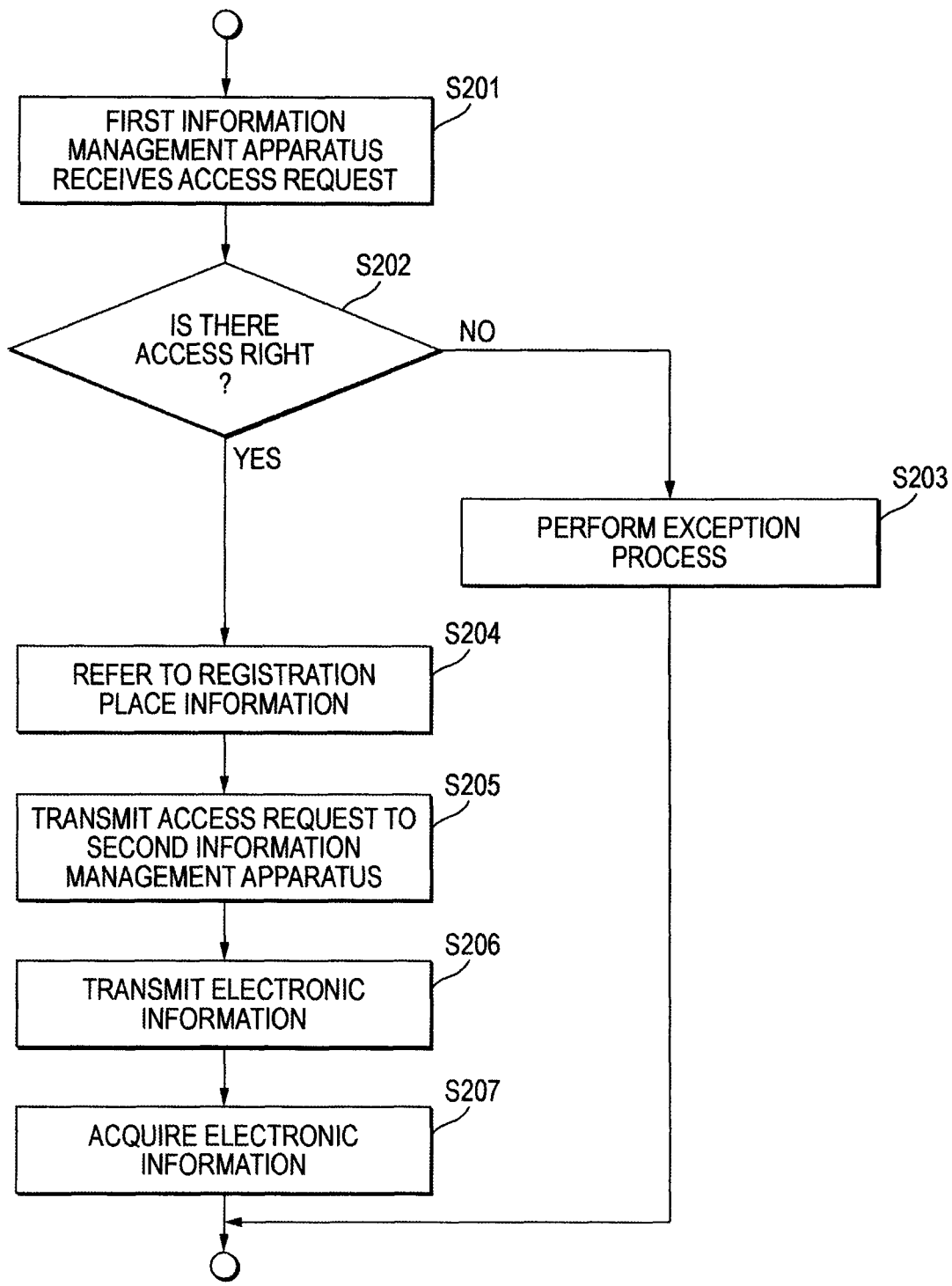
FIG. 6 shows another example of the operation of the information management system according to an embodiment of the present invention.

FIG. 6 shows another example of the operation of the information management system according to this embodiment. FIG. 6 shows an operation example in a case where there is an access request for electronic information from the user to the first information management apparatus 10 after the electronic information is transmitted from the first information management apparatus 10 to the second information management apparatus 20 as described with reference to FIGS. 4 and 5.

As shown in FIG. 6, when the first information management apparatus 10 receives the access request from the user, for example, through the computer 12 (S201), the access request transmission unit 116 checks whether the user sending the access request has the access right based on the access right information registered in the information storage unit 104 (S202). When the user does not have the access right, an exception process such as a process of notifying the user that there is no access right is performed (S203).

On the other hand, when it is checked that the user has the access right in S202, the access request transmission unit 116 acquires information indicating that target electronic information for the access request is included in the electronic information registration unit 202 of the second information management apparatus 20 by referring to the registration place information, for example, included in the management information shown in FIG. 3 (S204). Based on the acquired information, the access request transmission unit 116 transmits the access request to the second information management apparatus 20 (S205).

The access control unit 206 of the second information management apparatus 20 to which the access request has been transmitted acquires the target electronic information for the access request from the electronic information registration unit 202 and transmits the acquired target electronic information to the first information management apparatus 10 (S206). At this moment, the access control unit 206 checks that the target electronic information for the access request is included in the electronic information registration unit 202, based on the registration place information registered in the information storage unit 204 in advance.

The access request transmission unit 116 of the first information management apparatus 10 acquires the transmitted electronic information (S207), and transmits the acquired electronic information to the computer 12 that has transmitted the access request.

When there is an access request to the second information management apparatus 20 side, for example, through the computer 22, it may be configured that the access control unit 206 acquires the target electronic information from the electronic information registration unit 202 based on the registration place information that has been registered in the information storage unit 204 in advance. In such a case, it is appropriate that the access right information is registered in the information storage unit 204 in advance and the access control unit 206 checks whether the user who has requested the access has the access right.

A program for performing the above-described steps shown in FIGS. 4 and 6 may be stored on a recording medium or may be provided through communication means. In such a case, the above-described program may be conceived as an invention of a "computer-readable recording medium having a program recorded thereon".

The "computer-readable recording medium having a program recorded thereon" means a recording medium that is used for installment, execution, or distribution of a program, have a program recorded thereon, and can be read by a computer.

The recording medium includes, for example, a DVD-R, a DVD-RW, a DVD-RAM, and the like, which are standards defined by a DVD forum, and DVD+R, DVD+RW, and the like, which are standards defined as DVD+RW, as digital versatile discs (DVD), a read only memory (CD-ROM) CD, a CD recordable (CD-R), a CD rewritable (CD-RW), and the like as compact discs (CD), a magneto-optical disc (MO), a flexible disc (FD), a magnetic tape, a hard disk, a read only memory (ROM), an electrically erasable and programmable read only memory (EEPROM), a flash memory, a random access memory (RAM), and the like.

The above-described program or a part thereof can be recorded on the recording medium to be preserved or distributed. In addition, the program may be transmitted through a transmission medium, for example, a wired network used for a local area network (LAN), a metropolitan area network (MAN), a wide area network (WAN), the Internet, an intranet, an extranet, or the like, a wireless communication network, or a transmission medium combining the above-described networks. Furthermore, the above-described program or a part thereof can be loaded on a carrier wave to be transmitted.

The above-described program may be a part of another program, or may be recorded on a recording medium together with another program. Furthermore, the above-described program may be divided and recorded on a plurality of recording media.

Although embodiments of the present invention have been described as above, the present invention is not limited to the above-described embodiments.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information management system comprising:
a first information management apparatus including:
    a first transmission/reception unit that transmits or receives information;
    a first registration unit that registers electronic information in association with identification information in response to a registration request for the electronic information which is received by the first transmission/reception unit;
    an information storage that stores access right information and registration place information in which the electronic information is included in association with the identification information, the access right information representing whether a user has an access right, and the registration place information representing whether the electronic information is registered in any registration units;
    a condition storage that stores a condition for prohibiting an access to the electronic information registered by the first registration unit,
        wherein the condition is satisfied if access right information of the electronic information registered by the first registration unit is changed to indicate that access to the electronic information based on an administrator's right is prohibited;
    a determination unit that, in response to access right information of the registered electronic information being changed, determines whether the changed access right information satisfies the condition stored in the condition storage;
    a registration request transmission unit that, in response to a determination by the determination unit that the changed access right information satisfies the condition, thereafter transmits a registration request for the electronic information to an external information management apparatus through the first transmission/reception unit;
    a change unit that, in response to the determination by the determination unit that the changed access right information satisfies the condition, thereafter replaces the registration place information associated with the identification information of the electronic information with a transmission destination to which the registration request is transmitted by the registration request transmission unit;
    a deletion unit that deletes the electronic information stored in a transmission source in response to the registration request for the electronic information being transmitted by the registration request transmission unit; and
    an access request transmission unit that transmits an access request to the external information management apparatus represented in the registration place information through the first transmission/reception unit in a case where the registration place information associated with the identification information of the electronic information for which the access request has been made by the first transmission/reception unit represents the external information management apparatus and it is checked that a user who has transmitted the access request has an access right based on the access right information associated with the identification information;
    wherein the electronic information is transmitted to the transmission destination which stores the transmitted electronic information,
    wherein the administrator's right grants access to all files of the transmission source that are generally necessary for performing maintenance operations on the transmission source, and
    wherein access to the transmitted electronic information stored in the transmission destination based on the administrator's right is prohibited; and
a second information management apparatus including:
    a second transmission/reception unit that transmits or receives information;

a second registration unit that registers the electronic information in accordance with the registration request for the electronic information which has been received by the second transmission/reception unit; and an access unit that accesses the electronic information registered by the second registration unit in accordance with the registration request for the electronic information which has been received by the second transmission/reception unit, wherein the access request transmission unit transmits the access request to the second information management apparatus, wherein the second transmission/reception unit receives the transmitted access request, and wherein the access unit accesses the electronic information in accordance with the received access request, in a case where the registration place information associated with the identification information of the electronic information for which the access request is received by the first transmission/reception unit represents the second information management apparatus and it is checked that the user who is transmitted the access request has an access right.

2. An information management apparatus comprising:

a transmission/reception unit that transmits/receives information;

a registration unit that registers electronic information in association with identification information in response to a registration request for the electronic information which is received by the transmission/reception unit;

an information storage that stores access right information and registration place information of the electronic information in association with the identification information, the access right information representing whether a user has an access right, and the registration place information representing whether the electronic information is registered in any registration units;

a condition storage that stores a condition for prohibiting an access to the electronic information registered by the electronic information registration unit,
wherein the condition is satisfied if access right information of the electronic information registered by the registration unit is changed to indicate that access to the electronic information based on an administrator's right is prohibited;

a determination unit that, in response to access right information of the registered electronic information being changed, determines whether the changed access right information satisfies the condition stored in the condition storage;

a registration request transmission unit that, in response to a determination by the determination unit that the changed access right information satisfies the condition, thereafter transmits a registration request for the electronic information to an external information management apparatus through the transmission/reception unit;

a change unit that, in response to the determination by the determination unit that the changed access right information satisfies the condition, thereafter replaces the registration place information associated with the identification information of the electronic information with a transmission destination to which the registration request is transmitted by the registration request transmission unit;

a deletion unit that deletes the electronic information stored in a transmission source in response to the registration request for the electronic information being transmitted by the registration request transmission unit; and an access request transmission unit that transmits an access request to the external information management apparatus represented in the registration place information through the transmission/reception unit in a case where the registration place information associated with the identification information of the electronic information for which the access request is received by the transmission/reception unit represents the external information management apparatus and it is checked that a user who has transmitted the access request has an access right based on the access right information associated with the identification information;

wherein the electronic information is transmitted to the transmission destination which stores the transmitted electronic information, wherein the administrator's right grants access to all files of the transmission source that are generally necessary for performing maintenance operations on the transmission source, and wherein access to the transmitted electronic information stored in the transmission destination based on the administrator's right is prohibited.

3. A non-transitory computer readable medium storing a program causing a computer to execute a process for moving electronic information satisfying a condition for prohibiting an access from a user having an administrator's right to another information management apparatus, the process comprising:

registering the electronic information in association with identification information in response to a registration request for the electronic information;

storing access right information and registration place information of the electronic information in association with the identification information, the access right information representing whether a user has an access right, and the registration place information representing whether the electronic information is registered in any registration units;

determining, in response to access right information of the registered electronic information being changed, whether the changed access right information satisfies a condition for prohibiting an access to the registered electronic information,
wherein the condition is satisfied if access right information of the registered electronic information is changed to indicate that access to the electronic information based on the administrator's right is prohibited;

in response to a determination that the changed access right information satisfies the condition, thereafter transmitting a registration request for the electronic information to an external information management apparatus;

in response to the determination that the changed access right information satisfies the condition, thereafter replacing the registration place information associated with the identification information of the electronic information with a transmission destination to which the registration request is transmitted;

deleting the electronic information stored in a transmission source in response to the registration request for the electronic information being transmitted; and transmitting an access request to the external information management apparatus represented in the registration place information in a case where the registration place information associated with the identification information of the electronic information for which the access request is received represents the external information management apparatus and it is checked that a user who has transmitted the access request has an access right based on the access right information associated with the identification information, wherein the electronic information is transmitted to the transmission destination which stores the transmitted electronic information, wherein the administrator's right grants access to all files of the transmission source that are generally necessary for performing maintenance operations on the transmission source, and wherein access to the transmitted electronic information stored in the transmission destination based on the administrator's right is prohibited.

\* \* \* \* \*